UNITED STATES PATENT OFFICE.

WILLIAM N. BLAKEMAN, JR., OF NEW YORK, N. Y.

PAINT COMPOUND.

No. 883,513.

Specification of Letters Patent.

Patented March 31, 1908.

Application filed January 24, 1905. Serial No. 242,504.

*To all whom it may concern:*

Be it known that I, WILLIAM N. BLAKEMAN, Jr., a citizen of the United States, and resident of the borough of Manhattan, in the city, county, and State of New York, have invented certain new and useful Improvements in Paint Compounds, which invention is fully set forth in the following specification.

The object of this invention is to render available for use, in the manufacture of paint, those pigments which carry no water in combination and were formerly known as anhydrous, but which may also be designated as pigments containing no hydroxyl. Pigments free from hydroxyl do not form satisfactory compounds, are deficient in spreading power, and are very slow in drying, when ground in the usual oil-vehicle; and Dutch lead, in consequence of its quick formation of a saponaceous compound-due to the hydrated oxid of lead which it carries in combination—has, heretofore, been regarded as the only white pigment suitable for use as a sole basis for paint.

I have discovered that commercial linseed and other oils, can be so treated that all those pigments which, ordinarily, are deficient in spreading power shall, when ground therein and applied as paints, spread in a smooth, uniform and elastic film, and dry rapidly—in all respects equal to the combination of Dutch lead in linseed oil. This I accomplish by hydrating the oil.

The oil (linseed for example) may be hydrated in several ways:

First. It may be exposed in shallow vessels, with broad surfaces, to the action of air and light, until it has been sufficiently hydrated, which may require several months, the time depending upon climatic conditions. To test the oil, the film test may be resorted to: When 100 parts of the oil are ground with 240 parts of either lead sulfate or sublimed lead, with the usual quantity of commercial liquid drier, and being spread as a paint, it follows the brush in a smooth, homogeneous and uniform film, does not run, crack or craze, and dries in from 3 to 5 hours according to climatic conditions, the oil may be deemed in a satisfactory state for use as a vehicle for the pigment used, and the hydration process may be arrested.

Second: The oil may be placed in vessels having broad surfaces, and these vessels suspended over a body of water, with a covering arranged to retain a vaporous atmosphere in contact with the oil. This will shorten the process to a few weeks.

Third. The oil may be placed in vessels having broad surfaces, with from 1/25 to 1/20 of one per cent. of distilled water distributed on the bottom, and these vessels exposed to light, and the oil agitated at intervals until the water has been absorbed and combined in the oil. This method may also require a few weeks, but may be shortened to 6 or 8 days if the vessels be exposed to continuous bright sunlight.

Fourth. The oil may be heated in a vessel, suitably arranged for observation, at a temperature of about 140° Fahr., with from 1/25 to 1/20 of one percent. of distilled water distributed on the bottom in as small globules as possible to increase contact area. The water will soon take on the appearance of encystment, and I use gentle agitation to break up the encystation as fast as it forms, until all has been absorbed and combined in the mass of oil, which will take from 8 to 10 hours.

Fifth. The oil may be first oxidized by heating the raw oil on oxidizers; or by submitting it, with heat, to the action of pure oxygen under pressure; or by passing through it, with heat, thoroughly dried air; or by adding to it a percentage of highly oxidized, or "boiled", oil, of commerce; and then, when the oil has been so oxidized to any degree desired, it may be hydrated in any of the ways above described.

After hydration, the oil may be used immediately as a vehicle, but if allowed to stand in a closed vessel for a few days, for "blending" or "aging", it will be found advantageous.

Commercial linseed, tung, or other oils, animal or vegetable, treated by my process as above described, will not be appreciably affected in fluidity, and an analysis of the same will show the presence therein of a hydrated fatty acid or acids not found in fresh commercial oil.

My hydrated oil will form satisfactory compounds with, and impart spreading power to, all pigments ordinarily deficient in spreading power when ground in oil.

Among the pigments which may be used, either singly or in combination, are lead sulfate, lead sulfite, anhydrous carbonate of lead, sublimed lead (also called oxysulfate or zinco-sulfate of lead) zinc oxid, zinc sulfid, barium sulfate, barium carbonate, calcium carbonate, strontium sulfate, strontium carbonate, and the like. Thus, 100 parts of commercial linseed oil, hydrated as above described with 1/20 of one percent. of water, when ground with 240 parts of sulfate of lead, or 240 parts of zinco-sulfate of lead, or 80 parts each of lead sulfate and zinc oxid, and spread as a paint (with the usual quantity of liquid drier) will follow the brush in a smooth and uniform film, in all respects equal to white lead in linseed oil, and will dry in from 3 to 5 hours according to climatic conditions.

The degree of hydration to be imparted to commercial oil will depend partly upon the character of the pigment with which the oil is to be used. From 1/25 to 1/10 of one per cent. of water will be found sufficient for nearly all the pigments named, although in making some combinations of oxids, carbonates and other salts, more may be required— a matter which can be easily regulated in practice. For use with lead pigments, the oil should be hydrated with from 1/25 to 1/20 of one per cent. of water, while for use with zinc pigments from 1/15 to 1/10 of one per cent. of water should be used.

Additional spreading power will be obtained for the paint, if, in addition to hydrating the oil-vehicle, the pigment be treated by combining therewith a hydrated metallic or earthy oxid. Various hydrates may be used for this purpose, but I prefer to employ hydroxid of zinc, of which I take 1 1/2 parts calculated in terms of its dry state (although I prefer to use it in the condition of "slip" or "pulp"), and, after attenuating it in water, incorporate it with 100 parts of pigment— say sublimed lead or zinco—sulfate of lead. Enough water should be used to thoroughly wet the pigment and the water afterwards evaporated at a gentle heat. The hydroxid, if desired, may be precipitated upon its pigment at its first formation, but the above method will be found more satisfactory and exact. Five per cent. or less, of the zinc hydroxid, or other hydroxid, will be found sufficient, a light or bulky pigment requiring a larger percentage than a dense or heavy one. From 3/4 of one per cent. to 1 1/4 per cent, on a lead pigment will be enough for use with a hydrated oil vehicle. Thus, for example, 100 parts of linseed oil hydrated with 1/25 of one per cent. of water, and 240 parts of lead sulfate or lead sulfite, carrying about one per cent. of zinc hydroxid; or 100 parts of linseed oil, hydrated with 1/10 of one per cent. of water, and 120 parts of zinc oxid or zinc sulfid carrying 3 per cent. of zinc hydroxid, will form satisfactory compounds.

It is to be understood that any pigment or combination of pigments, may be ground to a paste form with from 5 to 7 per cent. of an oil-vehicle hydrated sufficiently to form a satisfactory compound therewith, and afterwards reduced or extended in untreated commercial oil, exactly as "white lead ground in oil" is now known to the trade. I do not, however, herein specifically claim such a paste, the same being claimed in my application No. 274,772, filed August 18, 1905. Two or more oils, drying or non-drying, may be combined to form a vehicle, if desired.

Heat, pressure and agitation may be used at any stage of the process, if deemed advisable.

I wish to draw a clear distinction between oil carrying interstitial water, hygrometric water, or water of emulsion, and oil hydrated by my process. Interstitial water may be filtered out by passing through a hygroscopic salt, or by heating to 212° Fahr.; and the presence of such interstitial water, or water of emulsion, in a paint, will cause it to disintegrate. In my process the water is chemically combined with the oil, and it can be dissociated and driven off only by raising the temperature considerably above the boiling point (say 280° to 300° Fahr.) and it is this chemical combination that causes the oil to form with a pigment a permanent saponaceous compound.

Having thus fully described my invention, I claim:

1. A compound or mixture of a pigment deficient in spreading power, and hydrated fatty oil.

2. A compound or mixture, of a pigment deficient in spreading power, and a hydrated drying fatty oil.

3. A compound or mixture, of a pigment deficient in spreading power, and an oil oxidized and hydrated.

4. The process herein described which consists in first hydrating a fatty oil and then grinding therein a pigment deficient in spreading power.

WM. N. BLAKEMAN JR.

Witnesses:
FRANCIS P. REILLEY,
CHAS. A. KANE.